INVENTORS
WILLIAM M. HUTCHINSON
WILLIAM J. MELVIN
BY Moody and Phillion
ATTORNEYS INVENTORS
WILLIAM M. HUTCHINSON
WILLIAM J. MELVIN
BY Moody and Phillion
ATTORNEYS INVENTORS
WILLIAM M. HUTCHINSON
WILLIAM J. MELVIN
BY Moody and Phillips
ATTORNEYS INVENTORS
WILLIAM M. HUTCHINSON
WILLIAN J. MELVIN
BY
Moody and Phillion
ATTORNEYS INVENTORS
WILLIAM M. HUTCHINSON
WILLIAM J. MELVIN
BY Moody and Phillion
ATTORNEYS INVENTORS
WILLIAM M. HUTCHINSON
WILLIAM J. MELVIN
BY
Moody and Phillips
ATTORNEYS INVENTORS
WILLIAM M. HUTCHINSON
WILLIAM J. MELVIN
BY
Moody and Phillion
ATTORNEYS INVENTORS
WILLIAM M. HUTCHINSON
WILLIAM J. MELVIN
BY Moody and Phillion
ATTORNEYS INVENTORS
WILLIAM M. HUTCHINSON
WILLIAM J. MELVIN
BY
Moody and Phillion
ATTORNEYS INVENTORS
WILLIAM M. HUTCHINSON
WILLIAM J. MELVIN
BY Moody and Phillion
ATTORNEYS

GLASS DELAY LINE RECIRCULATING MEMORY

INVENTORS
WILLIAM M. HUTCHINSON
WILLIAM J. MELVIN
BY Moody and Phillips
ATTORNEYS 3,432,816

GLASS DELAY LINE RECIRCULATING MEMORY

William M. Hutchinson, Newport Beach, and William J. Melvin, Costa Mesa, Calif., assignors to Collins Radio Company, Cedar Rapids, Iowa, a corporation of Iowa Filed Jan. 10, 1966, Ser. No. 519,732
U.S. Cl. 340—173 28 Claims
Int. Cl. G11b *13/00;* H03k *19/00;* G06f *7/00*

This invention relates generally to recirculating memories and more specifically to a recirculating memory employing a glass delay line and capable of handling a large number of data bits at a high frequency.

There are in the prior art many types of memory devices. More specifically, there are random access memories employing magnetic cores or electrostatic elements, memories comprising magnetic drums or magnetic discs which are not random access, and recirculating memories employing delay lines. Generally speaking, the amount of information capable of being stored in a recirculating memory is somewhat less than the capacity of the magnetic core memory or the amount of data bits that can be stored on drums or discs. The recirculating memories employing delay lines also have the characteristic of loss of data should the power system fail, since the storage consists of pulses which flow continually in a circuit loop. However, in many cases, where large capacity memory is not required, the recirculating type memory offers a reliable and inexpensive means for storing data with fairly rapid access.

One of the main difficulties encountered in recirculating memories is the variation of delay time in the delay line due to temperature changes. Such changes in delay time result in an output from the delay line which is out of synchronism with the main clocking signals of the overall system in which the memory is employed. There are available zero-temperature coefficient delay lines in which the delay time remains constant over a wide temperature range. However, such zero-temperature coefficient delay lines exhibit very high loss so that if a long delay time is needed, the loss is so great as to render the delay line impractical. To give an idea of the order of capacities and frequencies needed in present-day applications of recirculating memories, assume that it is desired to store 10,000 bits, supplied at a 20 megacycle rate. To store these 10,000 bits requires a delay line of approximately 400 microseconds in length. The presently known zero-temperature coefficient delay lines are incapable of storing 10,000 bits for 400 microsceonds without producing excessive attenuation of the signal.

There are other types of delay lines, such as magnetostrictive delay lines or glass delay lines which can have a delay time of 400 microseconds without excessive loss. However, such delay lines are temperature sensitive. It would be possible to use ovens with these delay lies to maintain a contact temperature so that the equivalent of a zero temperature coefficient delay line would be obtained. However, the use of such ovens would involve considerable expense and add an element of unreliability, since a failure of the oven would result in a failure of the memory.

A primary object of the invention is to provide a high capacity, high frequency recirculating memory which can be sensitive to temperature change, but which does not require temperature control.

A further object of the invention is a high frequency, high bit capacity, low loss recirculating memory.

A third aim of the invention is a high bit capacity, high frequency recirculating memory which will automatically adapt to and compensate for unwanted changes in delay line length due to temperature change, without the aid of an oven.

A fourth purpose of the invention is a synchronous, high bit capacity, high frequency recirculating memory employing a delay line which will adapt to changes in delay line length to contnuously correct the phase of the data supplied out of the delay line to have the proper phase when fed back into the delay line input.

A fifth object of the invention is the improvement of recirculating delay lines generally.

In accordance with the invention there is provided a temperature sensitive delay line capable of handling a large number of bits at high frequency, and whose length (time delay), varies with temperature. The pulse train circulating in the memory is serial in nature and comprised of two main sections. The first section is the data portion and consists of a predetermined number of words and the second section consists of a burst of synchronizing pulses. The synchronizing pulses and the bits making up the words are all of the same time duration. For purposes of dicussion, assume that the data portion of the pulse train consists of 256 words, each word comprised of 34 bits for a total of 8704 bits, and that the burst of synchronizing pulses consists of 296 such pulses, for a total of 10,000 bits.

Logic means, including counting means, functions to keep track of the number of bits passing through the delay line during each complete recirculation cycle. When data bit number 8704 passes out of the delay line, the logic means functions to connect a first synchronizing signal generator to the output of the delay line. The 296 synchronizing pulses which follow the data bits function to synchronize said first synchronizing signal generator.

Other logic means function to respond a marking pulse at the end of the burst of synchronizing pulses to cause the said counting means to begin keeping count of the number of bits coming out on the delay line and also the address of each word. As mentioned hereinbefore, however, the delay time of the delay line will vary with temperature so that the phase of the output data from the delay line will not remain constant with the central clocking signal of the overall system in which the memory is employed. To accommodate for such change in phase there is provided a shift register connecting the output of the delay line to the input thereof and a second synchronizing pulse generator which functions to generate an output signal whose frequency remains constant with respect to the main timing clock of the overall system.

The output of the delay line is sampled by sampling signals generated by said first signal generator. Such samplings are employed to drive the input of the shift register. An intermediate stage of the shift register is shifted under control of the second synchronizing pulse generating system, however, so that the output signal of the shift register will always have a known and predetermined phase relationship with the main timing clock of the overall system.

In accordance with a feature of the invention, a plurality of such recirculating memories can be employed in a system, with each memory having a unique address and being under control of a central control system, as for example, a data processing center. Means are provided within each recirculating memory to supply a single bit to the aforesaid external control system at the end of each word. For example, the 32nd bit count of each 34 bit word can be transmitted to the external control circuit. Such 32nd bit count is actually the last bit of each word since the first bit is merely a spacer between words. Such 32nd bit count is used for synchronizing purposes. More specifically, within each 34 bit word there is contained an address comprised of 8 bits. In the present invention such 8 bits include the 20–27th bit counts of each word. Such 20–27th bit counts of each word contain the address of the next following word so that the central control system is advised in advance as to the address of the next following word and can process the next following word in any desired manner. The supplying of the 32nd bit count of each word to the external control system provides a means whereby said external control system can identify which of the bits of each word constitute the 20th to 27th bit counts.

In accordance with another feature of the invention, means are provided to either write a new word into the system at any selected address or to read-out from the memory any selected word. If desired, both a read-out and a write-in can be accomplished simultaneously on any given word position (address). Writing in a word will automatically erase a word already present in any given address position.

The above-mentioned and other objects and features of the invention will become more readily understood from the following detailed description thereof when read in conjunction with the drawings in which.

In describing the present invention, following general outline will be followed:

I. GENERAL OPERATION

A. *The recirculating memory.*—In this portion of the specification will be discussed the general operation of the recirculating memory employing a shift register means and two timing sources; one of the timing sources controlling the phase of the output of the delay line and the other timing source controlling the phase of the input to the delay line. The shift register means functions to supply the output of the delay line to the input of said delay line and at the same time change the phase thereof so that said phase will remain constant with that of a master time clock output.

B. *Timekeeping means.*—This section of the specification relates to the general means for keeping track of the particular word being supplied from the delay line and also the particular bit of each word.

C. *Write-in and read-out circuits generally.*—This porton of the specification relates to the general means for the writing-in and reading-out of data into and from the memory.

II. SPECIFIC OPERATION

A. *Recirculation loop and rephasing of pulse train.*—This portion of the specification discusses the details of loop operation with the aid of timing charts showing the specific relation between the phase of the delay line output and the phase of the delay line input signal.

B. *Nature of recirculating pulse train.*—This portion discusses the various types of information contained in a 34 bit word and its relation to external timing means.

III. TIMEKEEPING CIRCUITS

This section of the specification relates specifically to the detailed logic diagrams employed for keeping track of the particular word being supplied from the delay line and the particular bit in such word.

IV. WRITE-IN AND READ-OUT MEANS

This portion of the specification relates to the specific logic means for the writing-in of data from an external source such as a data processor and for the reading-out of a specific word from a specific recirculating memory.

V. SYSTEM OPERATION

This portion of the specification relates to an overall system employing two or more of the recirculating memories and means for selecting (addressing) any given one of said recirculating memories.

I. GENERAL OPERATION

A. *The recirculating memory*

Figure 1:
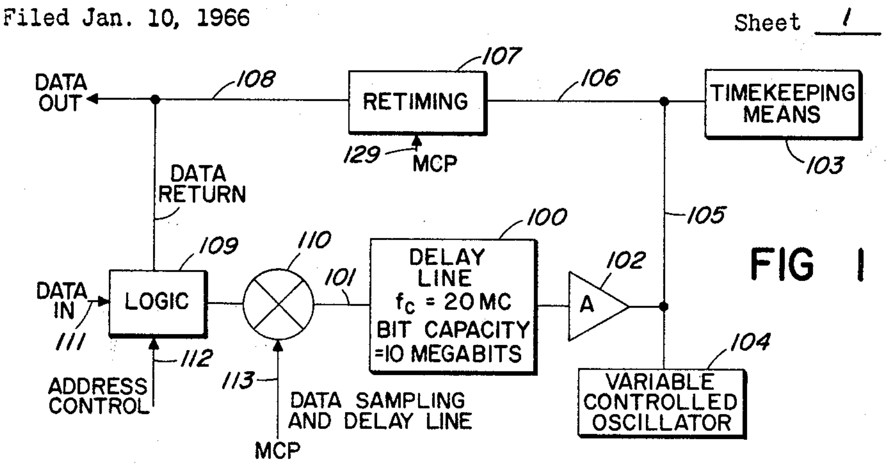
FIG. 1 is a broad, general block diagram of the basic recirculating memory loop.

Referring now to FIG. 1, the delay line 100 constitutes the heart of the recirculating memory and can be either a glass type delay line or a delay line of magnetostrictive material, such as a nickel alloy.

For purposes of discussion throughout the specification, assume that the delay line has a delay of approximately 500 microseconds and that the bit rate is 20 megacycles, that is to say, the bits are supplied to the delay line at a 20 megacycle rate. Therefore, since each bit occupies $\frac{1}{20}$ of a microsecond, the total bit capacity of the delay line is 20×500, or 10,000 bits. Most of such 10,000 bits are always in the delay line 100, although a few of them at all times are passing through retiming circuit 107 and logic circuit 109 of FIG. 1, as will be discussed in more detail later.

Assume further that the 10,000 bits recirculating in the memory include 256 words of 34 bits each for a total of 8704 bits. The remaining 296 bits constitute the synchronizing pulses for synchronizing the variable controlled oscillator 104 once during each complete recirculation of the stored pulse train.

More specifically, at the termination of the data bits a counting means will have counted the number of words and will indicate to the variable controlled oscillator 104 that the next burst of pulses will be synchronizing pulses. The oscillator 104 will thereupon respond to the synchronizing pulses to adjust its phase accordingly so that it will sample the next following 8704 data pulses near the center thereof at their maximum strength.

At the end of the burst of synchronizing pulses, all of which are marks, a single space occurs. Such single space is detected by appropriate detecting means which functions to disconnect the oscillator from the control of the output of the delay line. The oscillator 104 then functions to produce sampling pulses which will sample the next 8704 pulses, all of which are data pulses. Such samplings are supplied to retiming means 107 which is, as will be discussed later, a shift register. An intermediate stage of the shift register, or retiming circuit 107, is under control of a master timing clock pulse, identified herein as MCP, which is applied to the input lead 129 of retiming circuit 107. At the output of retiming circuit 107 there is produced a series of pulses whose phase bears a predetermined relationship with the phase of the master control pulse. It should be noted at this point that the master control pulse has a constant frequency and phase relationship with the main timing clock in the associated data processor which is not shown in the drawings. Such synchronization between the master control pulse and the timing system of the main processor is necessary in order to write information into the recirculating memory and to read information out of the recirculating memory.

The pulse train supplied from retiming circuit 107 passes through logic circuit 109 and into sampling circiut 110. The logic circuit 109 is provided to enable write-in and read-out of data into and from the recirculating memory.

Figure 12:
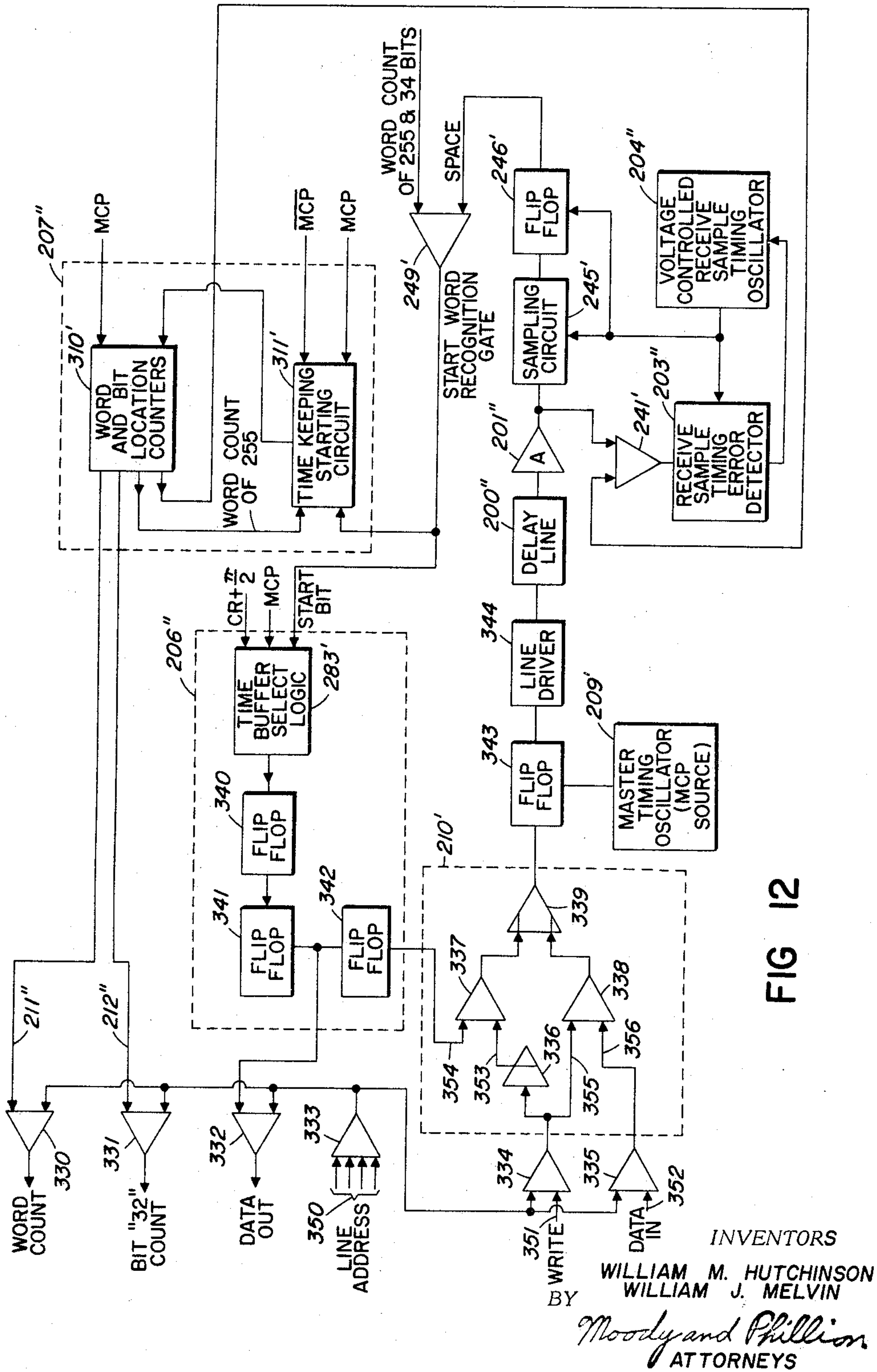
FIG. 12 is a logic diagram showing means for writing and reading of data into and out of the recirculating memory.

Sampling circuit 110 can be a bi-stable circuit driven by the output of retiming circuit 107 and can, in fact, be the last stage of the shift register circuit, as will be seen from a discussion of FIG. 12. Sampling of the data supplied to the circuit 110 is effected by the master control pulse which is supplied thereto through input lead 113. Thus the train of pulses recirculated back to the input lead 101 of delay line 100 has a frequency and a phase which bears a constant and predetermined relation to that of the master control signals supplied to lead 113.

Figure 2:
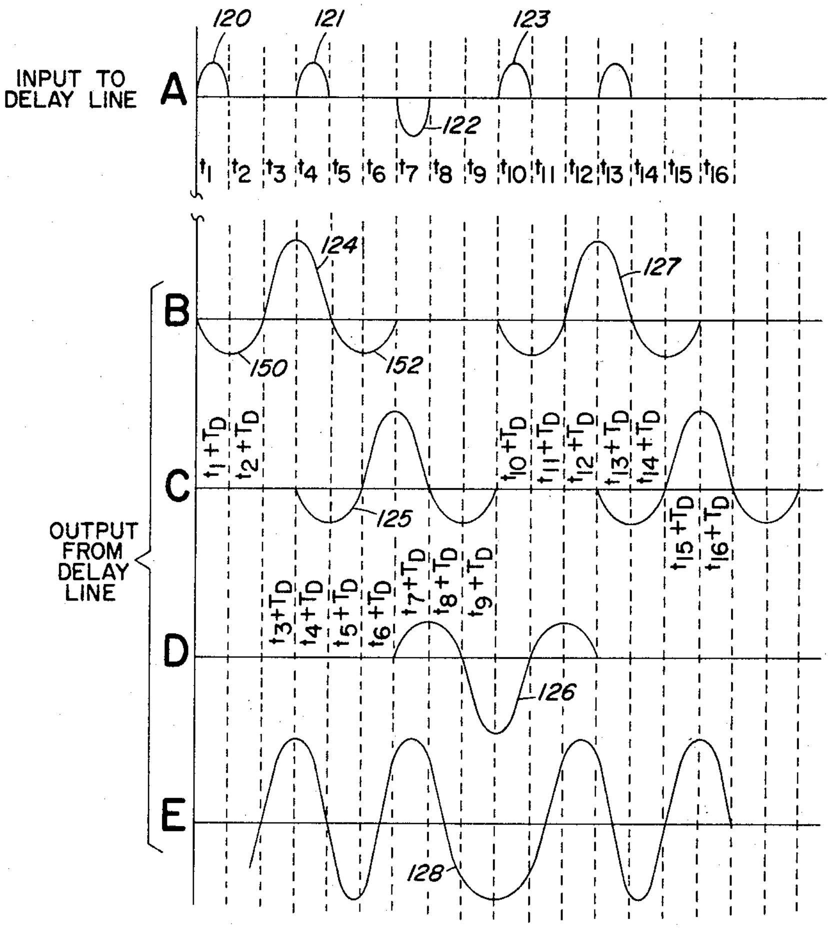
FIG. 2 is a group of waveforms showing the relationship between the input signals into the delay line and to the output signals from the delay lines.

Each pulse supplied to the input of delay line 100 will undergo a change in its waveform as it travels through the delay line. At the output of the delay line, a pulse will have the general shape as shown in waveforms B, C, and D of FIG. 2. More specifically, in FIG. 2A, there are shown two consecutive marks, 120 and 121, which are defined as being positive in nature, followed by a space input pulse 122, which is indicated as being negative in nature, and then followed by another mark pulse 123. Marks are also herein referred to sometimes as binary "1's" and the spaces as binary "0's." The two waveforms 124 and 127 of FIG. 2B represent the signals appearing at the output of the delay line caused by input signals 120 and 123 of FIG. 2A. Similarly waveform 125 of FIG. 2C represents the output signal caused by input pulse 121 of FIG. 2A, and waveform 126 of FIG. 2D represents the output waveform of glass delay line caused by input pulse 122.

It is to be noted that the waveforms of FIGS. B, C, and D actually occur one delay line time interval later than shown in FIG. 2. Thus, the time $t_1+T_D$ in FIG. 2B represents a point in time $T_D$ later than the time $t_1$ in FIG. 2A, where $T_D$ is delay line time length.

The waveform 126 has a polarity opposite to that of waveforms 124, 125 and 127. It will further be observed that each output pulse is comprised of three portions. For example, output pulse 124 is comprised of a negative portion 150 followed by a positive portion 151 and then a second negative portion 152 with zero amplitude levels (crossovers) occurring at times $t_1+T_D$, $t_3+T_D$, $t_5+T_D$, and $t_7+T_D$. The output waveform 125 also is composed of three portions as can be seen from FIG. 2C, and has zero amplitude levels occurring at times $t_4+T_D$, $t_6+T_D$, $t_8+T_D$, and $t_{10}+T_D$.

It can be seen from FIGS. 2B and 2C that the output pulse 124 can be sampled at its maximum amplitude level which occurs at time $t_4+T_D$ without interference from the next occurring pulse 125 of FIG. 2C. Similarly, the next following pulse 125 of FIG. 2C can be sampled at its maximum value which occurs at time $t_7+T_D$ without interference from the preceding pulse 124 of FIG. 2B, or from the next following pulse 126 of FIG. 2D.

Thus, by spacing the input pulses of FIG. 2A appropriately, a maximum pulse density in the delay line can be obtained, because of the coincidence of the sampling times with zero amplitude levels of the preceding and following output pulses. It is to be understood, of course, that the waveform appearing at the output of the delay line is not broken down into discrete pulses as shown in FIGS. 2B, 2C, and 2D, but rather is a composite waveform made up of the pulses shown in FIGS. 2B, 2C and 2D. Such a composite waveform is shown in FIG. 2E with samplings taken at times $t_4+T_D$, $t_7+T_D$, $t_{10}+T_D$, and $t_{13}+T_D$. The samplings taken at times $t_4+T_D$, $t_7+T_D$, and $t_{13}+T_D$ are positive in nature and indicate the presence of marks. The sampling taken at time $t_{10}+T_D$ is negative in nature and represents a space.

B. *Timekeeping means for recirculating pulse train*

Figure 3:
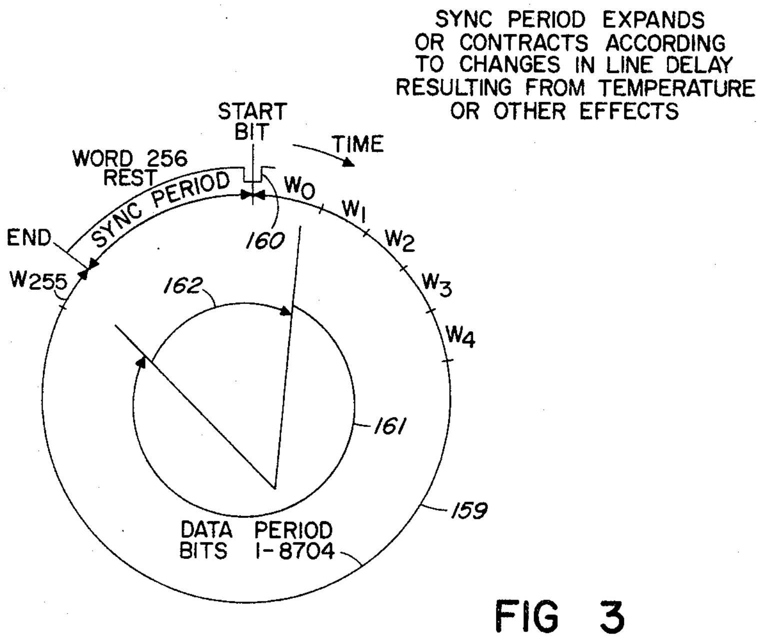
FIG. 3 is a chart showing the relationship between the data pulses and the synchronizing pulses over one complete recirculation of the pulse train in the delay line.

As discussed above, the pulse train consists of a data portion having 8704 bits, and a burst of synchronizing pulse portion consisting of 296 bits. The recirculation of the pulse train is shown graphically in FIG. 3 with the data represented by a circular line 159 symbolizing the recirculating nature of the data. The arcuate arrow 161 represents that portion of the pulse train containing data bits. The arcuate arrow 162 represents that portion of the pulse train consisting of synchronizing bits, which are all marks.

Assume that the synchronizing pulses are being supplied from the output of the delay line. At the end of the burst of synchronizing pulses a space bit 160 occurs which functions to reset to "0" the counters of the time-keeping means 103 of FIG. 1. The counters contained in timekeeping means 103 consist of a bit counter which counts the number of bits from 1 to 34 in each word. The second counter of timekeeping means 103 comprises a word counter which is incremented by a count of 1 every 34 bits, since a word contains 34 bits. Both the word counter and the bit counter are reset to zero at the occurrence of the space bit 160 (marking bit) of FIG. 4. Then as the data bits are supplied out of the delay line, counting begins in the two counters of timekeeping means 103.

In order that word synchronism may be obtained between the recirculating memory and an external equipment such as a data processor, for example, a particular pulse or bit of every word is transmitted to the external equipment. Specifically, in the present embodiment of the invention, such bit is the last bit of each word which is the 32nd bit count of each word. The external data processor receives this 32nd bit count and thereby becomes informed of the precise time position of the words in the recirculating memory. Since the location of the 32nd bit count of each word is known, and since the location of the address of each word is known with respect to the 32nd bit, the addressing of the recirculating memory can be effected. It should be noted that the address of any given word in the recirculating memory occurs during the 20 to 27th bit counts of the preceding word. By transmitting to the external data processor the address of a given word during the preceding word, sufficient advance notice is given the external data processor to process the selected word in a desired manner.

C. *Write-in and read-out circuits generally*

Some means is required to write data into the memory and to read data from the memory. Such function is accomplished by appropriate logic included within block 109 of FIG. 1. More specifically, a particular recirculating memory in a system can be selected by an address supplied to input lead 112. Such address does not select a given word from a memory, but merely selects a particular recirculating memory of several, which might be included in a given data processing system. FIG. 1 shows only a single such memory.

Once a desired memory is selected, data can be written into the memory by energization, or opening, of certain AND gates contained within logic block 109. The details of such logic will be discussed later herein. To read data from the memory, the external data processor detects the data appearing on output lead 108, which has already been retimed or rephased to have a predetermined and definite relationship with the master clock pulses (MCP) of the central data system.

II. SPECIFIC OPERATION

A. *Recirculation loop and rephasing of pulse train*

Figure 4:
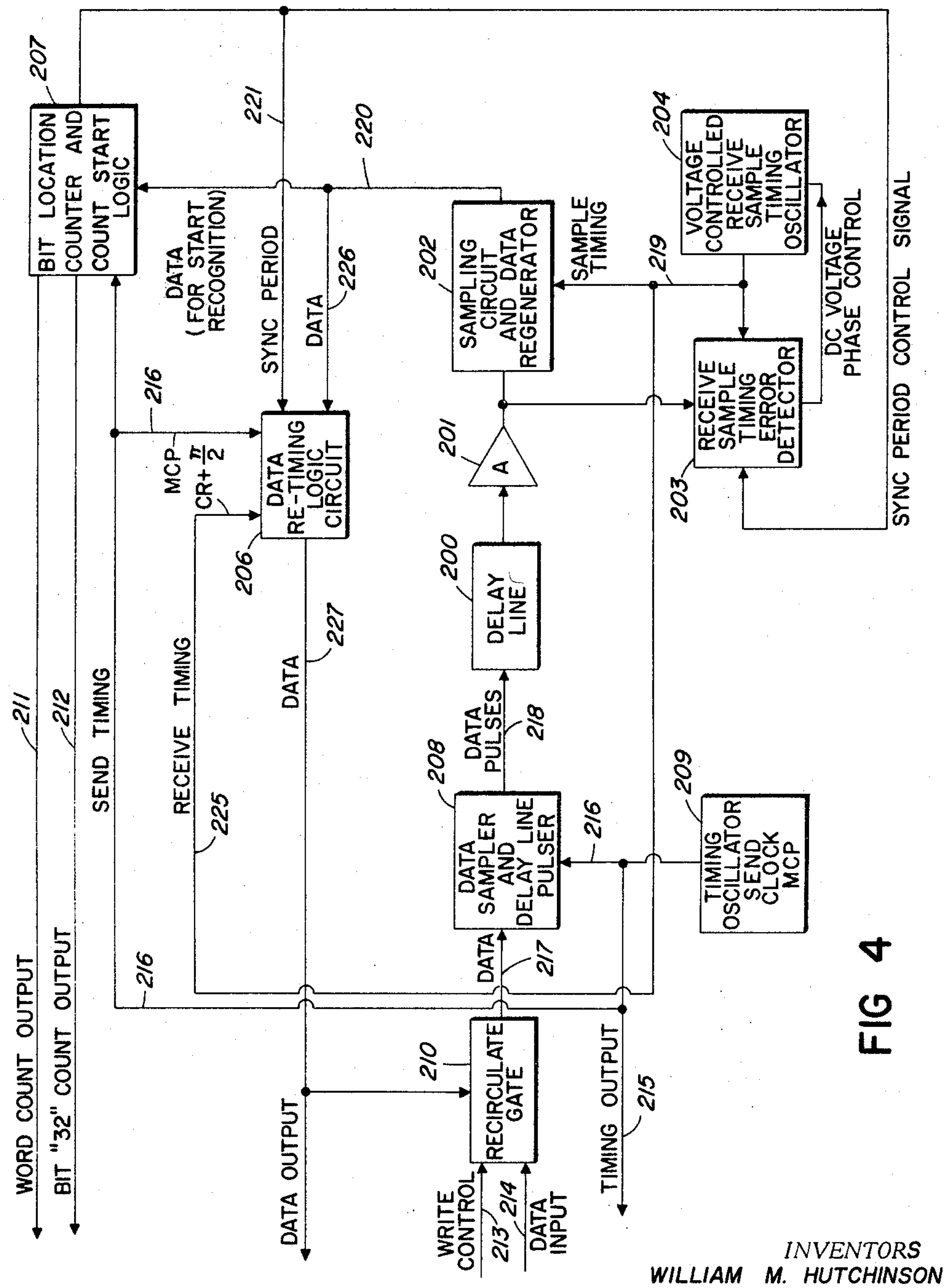
FIG. 4 is a more comprehensive block diagram of the system.

Referring now to FIG. 4, there is shown a more detailed block diagram of the invention. In FIG. 4 while many of the blocks shown therein have corresponding elements in the circuit of FIG. 1, different reference characters are used since many other blocks of FIG. 4 do not correspond exactly with a specific block of FIG. 1.

The output pulses from delay line 200 are passed thru amplifier 201 to two circuits. One of these circuits is a sampling and data regenerator circuit 202 which functions to produce a reshaped data output, as shown in the waveform of FIG. 5A. The phasing of the data supplied from sampling circuit 202 is determined by the output of the receive timing oscillator 204 which is a voltage controlled oscillator.

The output of the delay line 200 is also supplied through amplifier 201 to error detector circuit 203, which also receives the output of the voltage controlled oscillator 204. The timing error detector circuit 203 is essentially a phase detector which compares the phases of the two signals supplied thereto to produce a D-C voltage which is employed to correct the phase of the output signal of oscillator 204 so that its positive transition occurs during the maximum amplitude of the output pulses of delay line 200. For example, referring again to FIG. 2, the positive rise times of the output of oscillator 204 will occur at time $t_4+T_D$, $t_7+T_D$, $t_{10}+T_D$, etc. The relation of the output of the receive clock 204 with the output of sampling circuit 202 is shown in curves 5B and 5A, with curve 5B representing the waveform of the receive clock output and curve 5A representing the data output of sampling circuit 202.

As discussed before, the phase of the output of sampling circuit 202 bears no predetermined relationship with the phase of the master timing of the overall system. Such master timing is represented by the waveform of FIG. 5E, which waveform is also identified herein as the master clock pulse (MCP). Such master clock pulse is generated by timing oscillator clock 209 which is maintained in synchronism with the master timing of the central data processing, not shown in the invention, but of which the present invention is assumed to be a peripheral portion.

It is desired that the output of sample circuit 202 be shifted in phase to bear a predetermined relationship with the master clock pulse, and more specifically, with the positive transition of the master clock pulse. As can be seen from the curve of FIG. 5F, such positive transitions occur at times $t_a$, $t_b$, and $t_c$, which times lie near the center of the bits of FIG. 5A. It is possible, however, since the phase of the data from sampling circuit 202 bears no predetermnied relationship to the master clock pulse, that the positive transitions of the master clock pulse will occur very close to the transitions of the data bits of FIG. 5A. Such a condition is shown in the curve of FIG. 5J wherein the positive transitions of the master clock pulse occur near the transition of the waveform of FIG. 5H.

Figure 5:
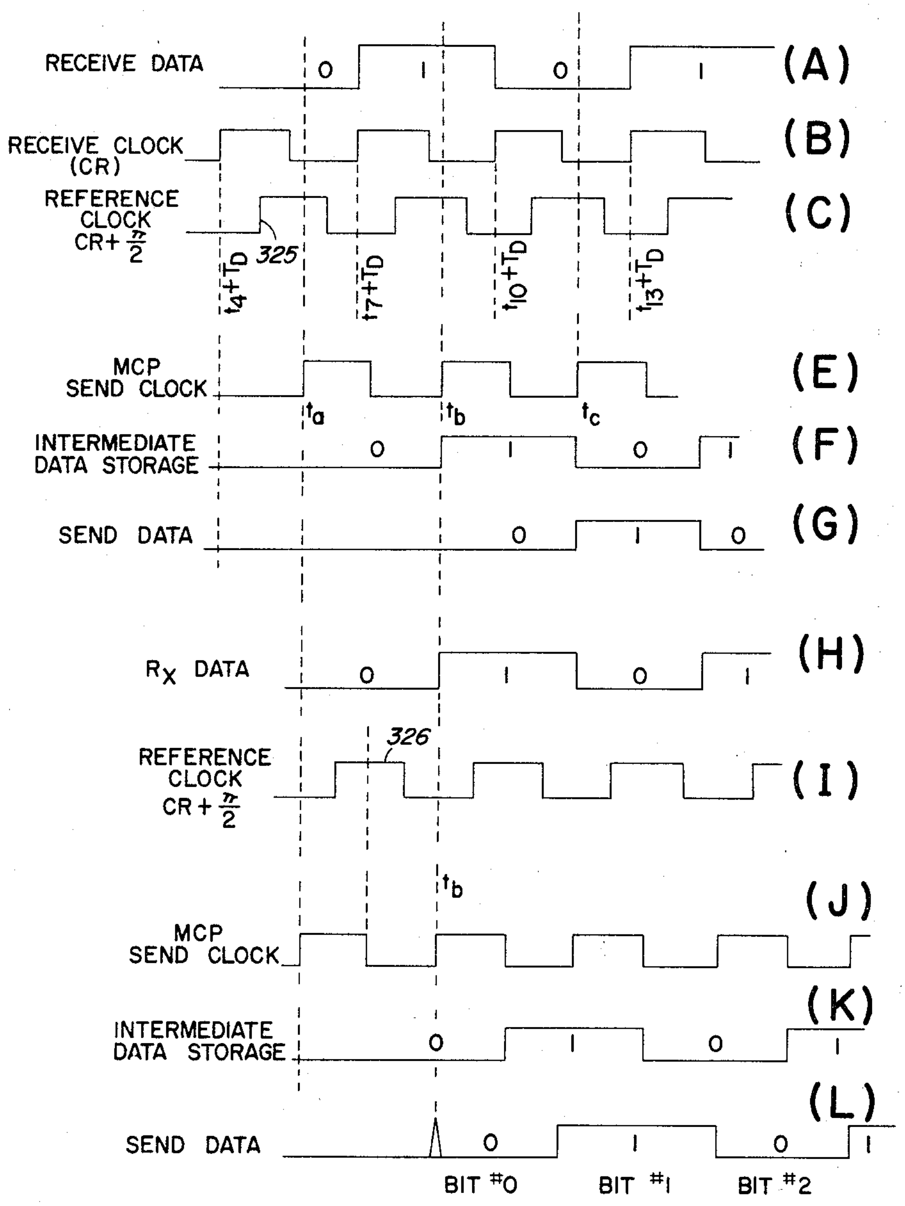
FIG. 5 is a set of waveforms for facilitating an understanding of the means by which the phase of the output signal of the delay line is changed to insure coincidence with the phase of the main timing clock.

Since most reliable results are gained by sampling the waveform of FIG. 5A near the center of each bit, it is obviously undesirable to use the positive transitions of the master clock pulse as a sampling time unless such positive transitions occur near the middle of the data bits. If the positive transitions of the master clock pulse do not occur near the middle of the bits, then the negative transtiions of the master clock pulse can be used for sampling purposes. As will be seen from the following discussion, it is an easy matter to shift the phase of the data signal to exactly the same position re the MCP signal whether the positive or negative transitions of the master clock pulses are used for sampling. It is only necessary that the circuit know whether the MCP transition used for sampling is positive or negative. The waveforms of FIG. 5 cover both situations as will be seen from the following discussion.

The means for determining whether the positive or negative transitions of the master clock pulse occur nearest the center of the data bits of FIG. 5A is as follows. The timing oscillator 204 is caused to produce a second square wave output signal which is shifted from the sampling waveform by 90°. Such second output is identified herein as the receive reference signal and is represented by the waveform of FIG. 5C. It will be observed that the positive half cycles of said reference signal are centered in the individual data bits of FIG. 5A. A logic circuit contained in retiming logic circuit 206 of FIG. 4 is provided to observe the type transition of the master clock pulse during the positive portion of the said reference output signal of oscillator 204 as shown in FIG. 5C.

Figure 6:
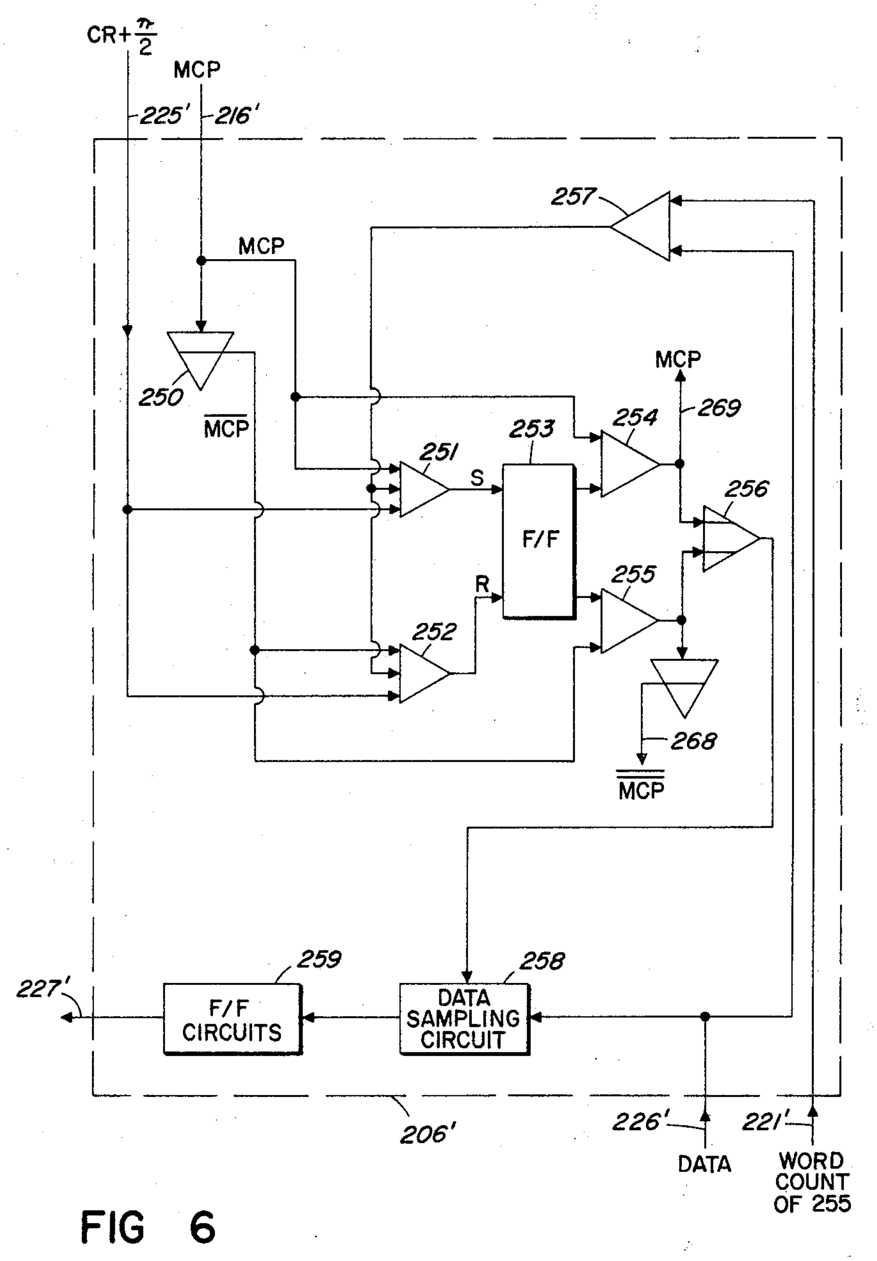
FIG. 6 is the logic diagram of the means for determining the necessary shifting time of the said intermediate stage of said shift register to insure phase coincidence between the input pulse train to said delay line and the main timing clock.

In FIG. 6 there is shown the specific logic of block 206 of FIG. 4 which will be described in detail after completion of the description of FIG. 4.

The output of block 206, when using the positive transitions of MCP as the sampling time, is shown in FIG. 5F and is supplied through the recirculating gate 210 to a third flip-flop data sampling means 208. The data sampling means 208 can be a flip-flop type circuit which samples the data supplied from the retiming circuit 206 at the positive transitions of the master control pulse from oscillator 209. Thus, the output of data sampling circuit 208 is a waveform, as shown in FIG. 5G, which is delayed one data pulse interval from the output signal from retiming circuit 206, as shown in waveform 5F.

Assume now the case where the negative transition of the master control pulse occurs during the reference output signal from the received timing oscillator 204, as shown in FIG. 5I. It will be noted that the signal of FIG. 5I is the same signal as shown in FIG. 5B, except that both it and the received data signal of FIG. 5H have a different phase relation with the MCP pulse shown in FIG. 5J. More specifically, the curves of FIGS. 5H and 5I are simply the curves of FIGS. 5A and 5B redrawn, but with a different phase with respect to the MCP waveform of FIG. 5J, which waveform is maintained at a constant value so that it corresponds to the waveform 5E. It can be seen from an examination of the curves of FIGS. 5H, 5I, and 5J that the negative transition of the MCP signal occurs during the positive half cycles of the reference signal output of timing oscillator 204. As discussed above, the circuit within the block 206 of FIG. 4 functions to detect such occurrence and will respond thereto to invert the MCP waveform and employ the inverted negative transitions as the sampling signals.

The output of retiming logic circuit 206 in the case where the negative transitions of the MCP signal are employed, is as shown in FIG. 5K. Such output signal is supplied through recirculating gate 210 to data sampling means 208. The timing of data sampling means 208 is controlled by the positive transitions of the master control pulse MCP so that the output thereof is a waveform, as shown in FIG. 5L.

It is to be observed that the waveforms of FIG. 5G and 5L, both of which are outputs of sampling means 208 and derived by employing positive and negative transitions of the MCP waveform, respectively, are identical in phase. Thus, any ambiguity which may have been present in some parts of the circuit, due to the use of both negative and positive transitions of the MCP pulse, has been removed. The output of data sampling means 208 is supplied to delay line 200 where another recirculating cycle is originated.

Referring now to FIG. 6, there is shown a detailed logic diagram of the data retiming logic circuit 206 of FIG. 4. The input and output leads to the circuit of FIG.

6 are identified by the same reference characters as the input and output leads of block 206 of FIG. 4, although primed.

The following discussion will be divided into two general sections: the first section covering the case where the positive transitions of the MCP pulses fall during the occurrence of the positive portion of the reference output signal of oscillator 204; and the second section covering the case where the negative transitions of the MCP pulses occur during the positive portion of the reference signal from block 204.

It is seen in FIG. 6 that the reference signal from oscillator 204 is supplied directly to inputs of AND gates 251 and 252 through input lead 225'. The master control pulse MCP is supplied directly to an input lead of AND gate 251 and is supplied though inverter 250 to an input of AND gate 252. The output of AND gate 257 is supplied to inputs of both AND gates 251 and 252.

It should be noted at this point that the decision to use MCP or the inverted MCP ($\overline{MCP}$) is determined by the first space (marking pulse) occurring at the end of a burst of synchronizing pulses of the recirculating train of pulses. In general this is accomplished by coincidence of the word count of 255 in the word counter circuit and the space mark which occurs at the end of the synchronizing pulses. The word count of 255 is entered into the word counter by the recirculating data bits. Logic means, which will be described later, functions to sense the word count 255 and will cause the word counter to remain at such count until the synchronizing pulses and the marking space thereafter have occurred.

AND gate 257 is responsive to the word count of 255 and to the marking space to pass a pulse to AND gates 251 and 252. Assuming that the positive transitions of the MCP pulses occur during the position portions of the reference signal from oscillator 204, the AND gate 251 will pass a pulse to flip-flop 253 to cause said flip-flop to assume a set condition. Such set condition will exist for one complete recirculation of the stored train of pulses.

The AND gate 254 will then be conductive to the MCP pulses supplied thereto, which pulses will then pass through OR gate 256 to the data sampling circuit 258. Also supplied to the data sampling circuit 258 is the input data as shown by the waveform of FIG. 5A or FIG. 5H. The output of the data sampling circuit 258, which can be a series of pulses occurring at each positive transition of the MCP waveform, functions to energize a flip-flop 259 to either its set or reset state, depending upon the polarity of the sampled output pulse from data sampling circuit 258. Thus, the signal appearing on output lead 227' is the waveform of FIG. 5F.

In the case where the negative transition of the MCP signal occurs during the positive portion of the reference signal from oscillator 204, the inverted MCP pulse appearing at the output of inverter 250 controls and the AND gate 252 is energized to reset flip-flop 253 and thereby energize AND gate 255. The inverted MCP signal passes through AND gate 255 and OR 256 to the data sampling circuit 258, where the positive transitions thereof sample the incoming data which is shown in FIG. 5H. Such samplings are supplied to flip-flop 259 which produces an output waveform as shown in FIG. 5K. It will be observed that the phase of the signals of FIGS. 5F and 5K are not the same, but are 90° removed from each other. Thus, in FIG. 4 a third flip-flop 208 is required to produce the signals of FIGS. 5G and 5L, which signals have the same phase.

It is to be noted that a minimum of three flip-flop circuits are used in supplying the data from the output of amplifier 201 of FIG. 4 back to the input of delay line 200. These three flip-flops are included within blocks 202, 206, and 208, respectively and, in essence, form a data shift register whose shift timing changes from stage to stage in order to accommodate the difference in phase between the output signal of delay line 200 and the master control pulse from oscillator 209.

B. *Nature of recirculating pulse train*

Figure 7:
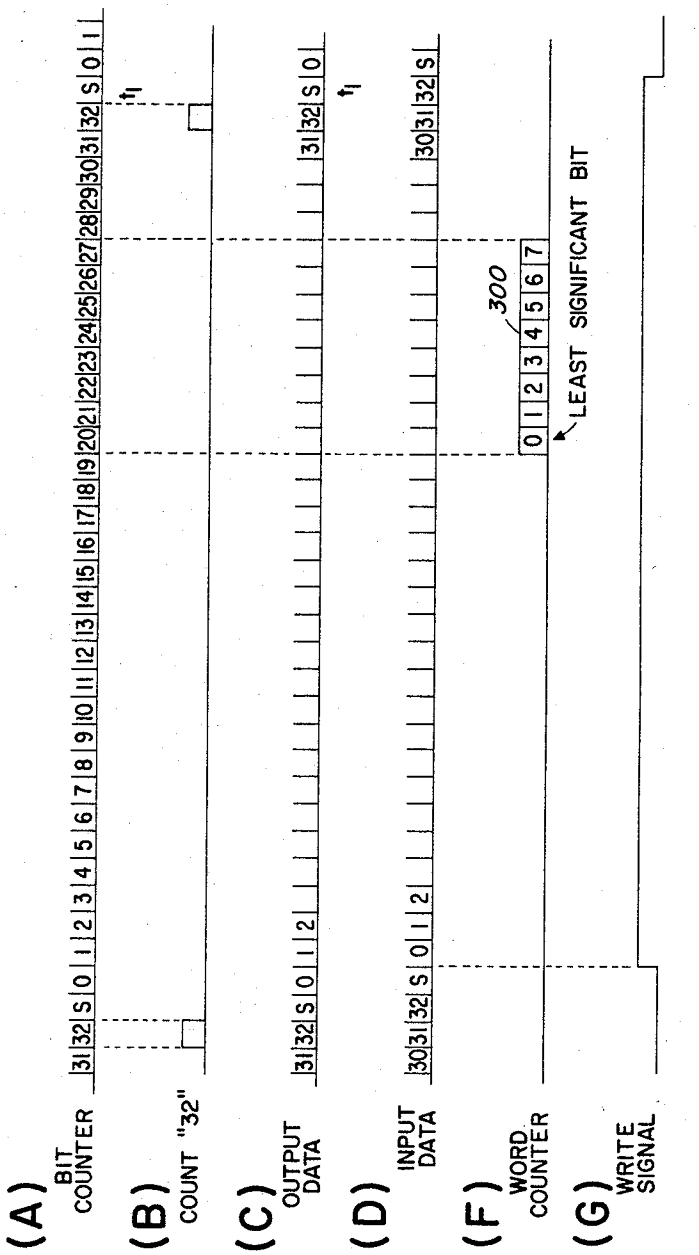
FIG. 7 is another set of waveforms showing the various functions of the bits of each word, which words contain synchronizing pulses and addresses, as well as data information.
Figure 8:
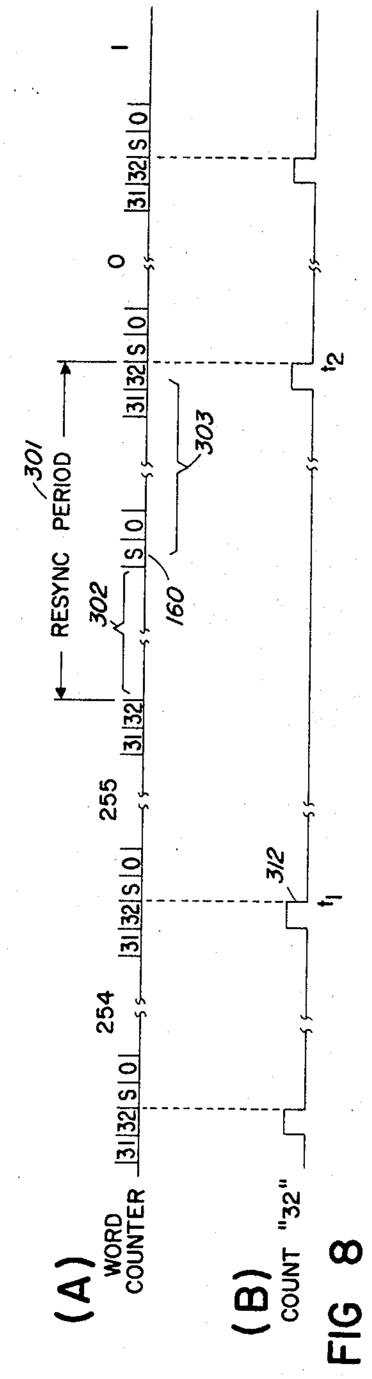
FIG. 8 is another set of waveforms illustrating the timing means for resynchronizing the data in a particular recirculating memory with an external clock (main timing clock) which might be located in a central data processing equipment.
Figure 9:
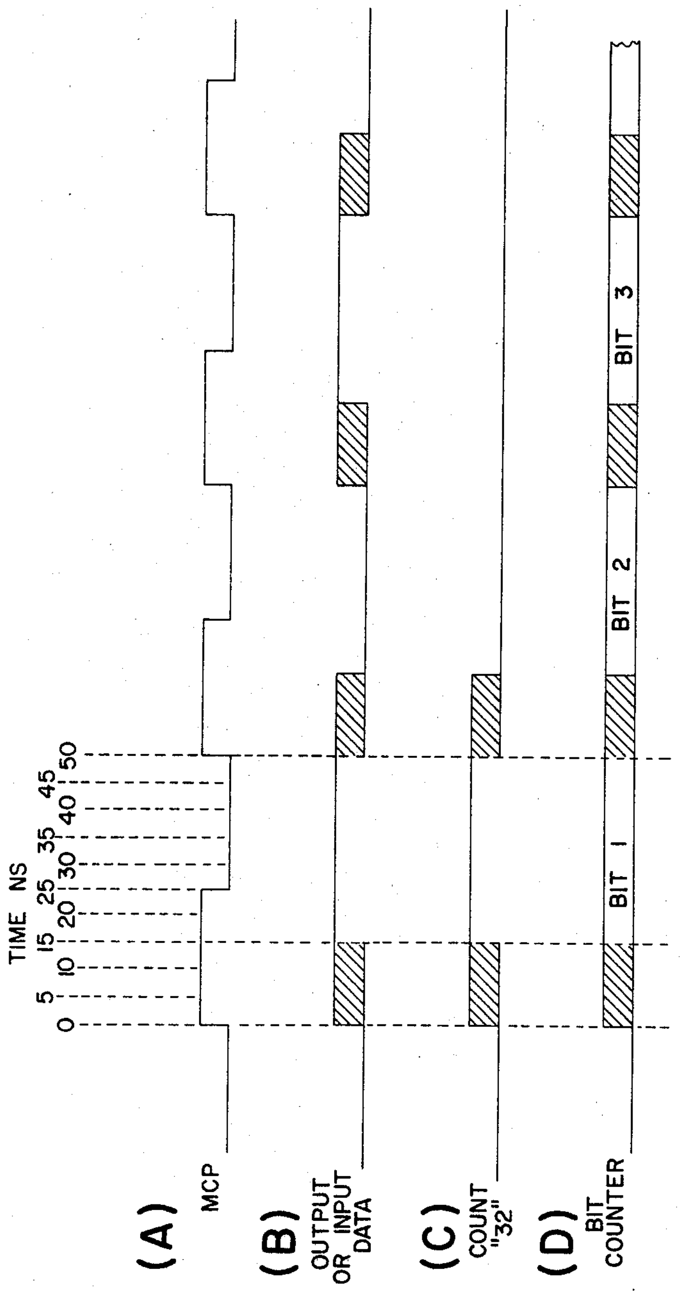
FIG. 9 is another set of waveforms illustrating the detailed relationship of the main clock timing system with the internal timing of the recirculating memory.

FIGS. 7, 8, and 9 are diagrams showing the composition of the recirculating pulse train, the signals of the timekeeping circuits, and the relation therebetween. More specifically, in FIG. 7A there is shown the count contained in the bit counter of block 207 of FIG. 4. FIG. 7B shows the bit 32 count of the bit counter, which count is supplied to external control circuits such as a data processor to enable said processor to know when each new word begins. It should be noted that the bit 32 count is actually the 34th count of the bit counter, which has a recycling count of 34 counts. The first count of a word is identified as "S" in FIG. 7A and is simply a spacer between words. The bit count 32, which is actually count 34 in the bit counter, is used for parity purposes. Bit counts 0 to 31 contain data. The output data is shown in FIG. 7C and can be seen to correspond exactly to the time intervals and bit count numbers of the bit counter of FIG. 7A.

FIG. 7D represents data which might be written into the recirculating memory. It will be noted that the bits of FIG. 7D follow the recirculating data by one bit intervals. Such lag time is required in order to enter data from an external data processor into the recirculating path. More specifically, as will be seen later, the output data is extracted from the recirculating memory at a given point in the recirculating path. The input data is supplied into the recirculating memory at a different point in the recirculating path. Between these two points is a flip-flop circuit through which the recirculating data must pass. In passing through such flip-flop circuit the recirculating data is delayed one bit interval. Thus the data input of FIG. 7D must lag the output data of FIG. 7C by one bit interval.

Means must also be supplied for informing the external data processor of the address of the circulating words. In order for the data processor to have time to decide what to do with any particular word, the address for such word is supplied to the data processor during the 20–27th bit count of the preceding word. Thus in FIG. 7F, the output of the word counter, which consists of a group of eight pulses 300, comprises the address of the next succeeding word, which begins at the time $t_1$ of FIG. 7C. The address of FIG. 7F consists of eight bits and, consequently, is capable of identifying $2^8$ or 256 different words. As discussed hereinbefore, $256 \times 34 = 8704$, which forms the data carrying portion of the recirculating train of pulses.

In FIG. 9 there is shown a detailed diagram of the various waveforms used in the system, illustrating that there is some delay between the beginning of a master control pulse as shown in FIG. 9A, for example, and the incrementing of an additional count in the bit counter as shown in FIG. 9D. Similarly, the output or input data of FIG. 9B and the bit count 32 of FIG. 9C lag the positive-going portion of the master control pulse by a short time interval of approximately 15 nanoseconds. The shaded area of FIG. 9 represents the transition time between levels of the various waveforms.

In FIG. 8 there is shown a waveform (partial) of the bit counting over a complete recirculating cycle. As discussed before, there is a period occurring once each recirculation of the pulse train, during which resynchronization of the receive oscillator 204 of FIG. 4 occurs. This resynchronizing period is designated by the reference character 301 of FIG. 8 and consists of two portions. The first portion 302 consists of all marks. It is during this first portion that the received timing oscillator is resynchronized. At the end of the first period, however, it is necessary to resynchronize the bit counter and the word counter contained in block 207 of FIG. 4. Basically, the word counter and the bit counter are set to zero by the marking space 160' shown in FIGS. 8 and 3. However, since such marking space is synchronized with the pulses coming out of the delay line, but is not properly phased with the master control pulse (MCP) of the system, the resetting of the bit counter and the word counter cannot be effected solely by the marking bit 160″ but must also be made to occur at a given time with respect to the MCP. More specifically, referring to the waveforms of FIG. 5 again, it can be seen that the master control signals of FIGS. 5J and 5E each bear a different phase relation to the assumed received data signals of FIGS. 5A and 5H. The final output data waveforms, after the phase of the received waveform has been completely adjusted, is shown in FIGS. 5L and 5G, which have the same phase. In other words, regardless of the initial phase relationship between the master control pulse and the received data, the final output data waveform must always result in the same phase relationship with the master control pulse in order to obtain synchronization with the external data processor.

In the case where the positive transition of the master control pulse of FIG. 5E occurs during the reference clock positive half cycle 325 of FIG. 5B the bit count should not be reset to "0" until time $t_b$, at which time the first output data pulse will appear at the output of the recirculating memory as shown in FIG. 5G. It can be seen from FIG. 5E that such event occurs on the second positive transition of the master control pulse, after occurrence of reference pulse 325 of FIG. 5B, which is assumed to occur during the marking pulse after the burst of synchronizing pulses. The first such positive transition occur at time $t_a$.

On the other hand, in the case where the negative transition of the master control pulse of FIG. 5J occurs during the positive portion of the received clock reference pulse of FIG. 5I, only one transition of the MCP (FIG. 5J) occurs before the bit counter and the word counter must be reset to "0" at time $t_b$. Thus, some circuit means must be provided to accommodate such differences in starting times. Such a circuit is shown in FIG. 10 and will be discussed in the following section.

III. TIMEKEEPING CIRCUITS

A. *General*

Figure 10:
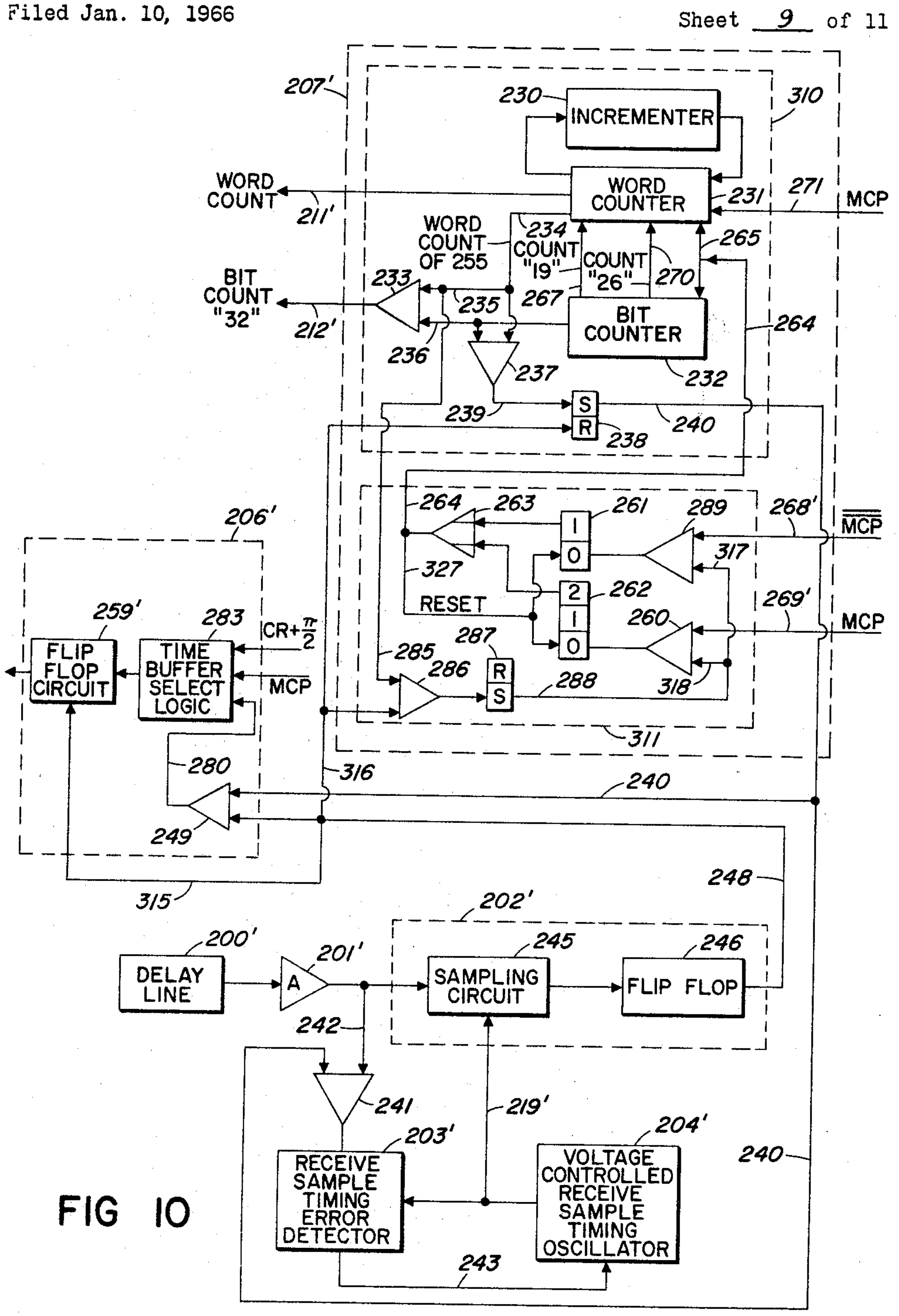
FIG. 10 is a logic diagram of the timekeeping circuits including the logic for initiating counting of the timekeeping circuits at the start of each recirculating cycle.

In FIG. 10, all the logic within block 207′ corresponds to the block 207 in FIG. 4. Within the block 207′ are two additional data blocks, 310 and 311. The block 310 contains the logic associated directly with the bit counter 232, the word counter 231, and its incrementer 230. The logic within block 311 is that logic which determines the precise time at which the bit counter 232 and the word counter 231 are reset to "0". The circuit means within block 206′ corresponds to the circuit means within block 206 of FIG. 4. The remaining logic shown in FIG. 10 includes other blocks shown in FIG. 4 and bear the same reference character, although primed. More specifically such remaining blocks include delay line 200′, amplifier 201′, and the sampling and data regenerator means 202′, comprised of sampling circuit 245 and flip-flop circuit 246. Other blocks, corresponding to those of FIG. 4, include the receive sample timing error detector 203′ and the VCO oscillator 204′. AND gate 241 has been added, the function of which will be explained in the following paragraphs.

The resynchronization or zeroizing of the timekeeping circuits begins at the coincidence of word count 255 and the bit count 32. Reference is made to the timing chart of FIG. 8, which shows the bit count 32, which marks the end of the 255th word. Since the bit count 32 not only enables the external data processor to synchronize with the bit counter, but also informs the processor that another word is to follow, the 32nd bit count of the 255th word will not produce an external count 32. Such count 32 is inhibited and the resynchronization period begins.

The bit count 32 of word 255 is inhibited by INHIBIT AND gate 233 of FIG. 10, which has supplied to its two input terminals the 255th word count from word counter 231 and the bit count 32 from bit counter 232. Thus, INHIBIT AND gate 233 will pass a count of 32 at all times when such count occurs, except when the word counter 231 contains a count of 255. Since the word counter 231 contains a count of 255 from time $t_1$ until time $t_2$ (FIG. 8) there will be no bit counts of 32 supplied to output lead 212′ during the resynchronizing period.

The coincidence of word count 255 and bit count 32 will also produce an output thrugh AND gate 237 to set flip-flop 238. Setting of flip-flop 238 will provide a binary "1" on lead 240 to open, i.e., to make conductive AND gate 241.

Opening of AND gate 241 permits the signal from delay line 200′ to pass into the timing error detector circuit 203′. At this time, as can be seen from FIG. 8, the signal supplied from delay line 200′ is the burst of synchronizing pulses.

The timing error detector circuit 203′ is basically a phase-comparing circuit and functions to compare the phase of the synchronizing signal from delay line 200′ and the output from VCO oscillator 204′. A D-C signal whose polarity and amplitude represents the difference in phase between the two applied signals, is supplied from the error detector circuit 203′ to VCO oscillator 204′ through lead 243 to correct the phase of the VCO oscillator. The output of oscillator 204′ is also supplied to a sampling circuit 245 to control the timing of the generation of the receiving pulse shown in FIGS. 5A and 5H. It is to be understood that the sampling circuit 245 functions to sample the output of the delay line at its maximum amplitude. Such sampling is then supplied to flip-flop circuit 246 which forms a rectangluarly shaped received output pulse.

After the burst of synchronizing pulses 302 of FIG. 8, the marking pulse 160 is then supplied via lead 248 to the input of AND gate 249. As was discussed above, a mark at this time appears on lead 240 due to the previous setting of flip-flop 238, which setting was caused by the coincidence of the word count 255 and bit count 32. Thus the marking pulse signal from flip-flop 246 passes through AND gate 249, and into the timekeeping circuits 207′, via lead 316. It should also be noted at this time that the output of AND gate 249 also passes to a time buffer select logic circuit 283 which is shown in detail in FIG. 6 and which functions to determine whether the MCP or the inverted MCP pulses ($\overline{MCP}$) should be used for sampling the receive signals. It should further be noted that the output of flip-flop 246 is bypassed around AND gate 249 and supplied directly to flip-flop circuits 259′ to permit a flow of data thereto after termination of the synchronizing pulses.

Returning again to the timekeeping circuit, AND gate 249 is designed to inhibit passage of the marks which make up the portion 302 of the resynchronizing signal (FIG. 8). At the termination of the burst of synchronizing pulses, the marking space 160 occurs, which will pass through AND gate 240 and into the timekeeping circuits 207′, where it will perform two functions. The first is to reset flip-flop 238 so as to remove the "1" from lead 240 and close AND gate 249. The second function is to provide a "1" to AND gate 286. Since the word count 255 still exists in word counter 231, AND gate 286 will thereby pass a "1" to set flip-flop 287 and supply "1's" to inputs 317 and 318 of AND gates 289 and 260.

Supplied to the other inputs of AND gates 289 and 260 are NOT $\overline{MCP}$ and MCP signals, respectively. Such signals can be obtained from the outputs 268 and 269 of FIG. 6. It is to be noted that because of the selecting function of the circuit of FIG. 6, a signal will appear only on one or the other of the leads 268′ or 269′ of FIG. 10. For purposes of discussion, assume that the positive transitions of the MCP pulses occur during the positive portion of the receive oscillator reference signal. In such a case, the MCP pulse will appear on the output lead 269 of FIG. 6 which is continued as input lead 269′ of FIG. 10. The inverted MCP signal will not appear on the output lead 268 of FIG. 6 since AND gate 255 is closed, i.e., is nonconductive.

Referring again to the curves of FIG. 5 and specifically to the curve of FIG. 5E, it will be noted that under the conditions set forth above, the bit counter 232 and the word counter 231 should not be reset until time $t_b$ which occurs at the second positive transition of the MCP after the reference pulse 325 occurs. To provide for such zeroizing of counters 231 and 232, the output of AND gate 260 feeds into a 3-stage counter 262 so that at time $t_a$ a count of 1 is entered into counter 262 and at time $t_b$ a count of 2 is entered into counter 262. Such count of 2 will pass through OR gate 263 and through reset input leads 265, to both counters 231 and 232, and will reset said counters to "0".

In the other case, however, where the negative transition of the MCP occurs during the positive portion of the reference pulse, a different zeroizing time must be employed. More specifically, refer to FIGS. 5I and 5J and assume that the pulse 326 of FIG. 5I is the reference pulse which occurs during the marking space 160' of FIG. 8. The output data will have the phase as shown in FIG. 5L, beginning at time $t_b$. The counters 231 and 232 of FIG. 10 should be reset to "0" at time $t_b$ which occurs at the first positive transition of the MCP pulse after the occurrence of pulse 326.

The $\overline{MCP}$ pulse is used to sample the receive data waveform of FIG. 5H under such conditions as discussed in connection with FIG. 6. Further, as discussed in connection with FIG. 6, an output signal will appear on output lead 268 which will be a double inverted master control pulse signal and which will, in esence, be the non-inverted master control signal. Such double inverted signal is supplied to input lead 268' of FIG. 10 and will, at the first positive transition thereof, pass through AND gate 289 to cause counter 261 to count to "1." Such a "1" will pass through OR gate 263 to reset counters 231 and 232 to "0" at time $t_b$. Counters 261 and 262 will both always be reset to "0" when an output pulse is passed through OR gate 263.

Referring back to the occurrence of the space pulse of 160' of FIG. 10, it is to be noted that when flip-flop 238 of FIG. 10 is reset thereby, and a binary "0" caused to appear on output lead 240, that AND gate 241 will be made nonconductive to block the output from delay line 200' from entering into the receive error detector circuit 203', thus terminating the synchronizing period for the VCO oscillator 204'.

The circuit within the block 206' of FIG. 10 has been described in detail in connection with FIG. 6 and will not be discussed herein again.

Referring again to FIG. 8, the reasons for having the resynchronizing word 303 will be discussed. Such reasons are twofold. Firstly, since the address of any given word is contained in the preceding word, a resynchronizing word is needed to provide the address for the word "0" which follows immediately. The second reason is to provide a bit count 32 to the data processor, thus enabling said data processor to synchronize with the bit counter and the word counter of the recirculating memory.

Figure 11:
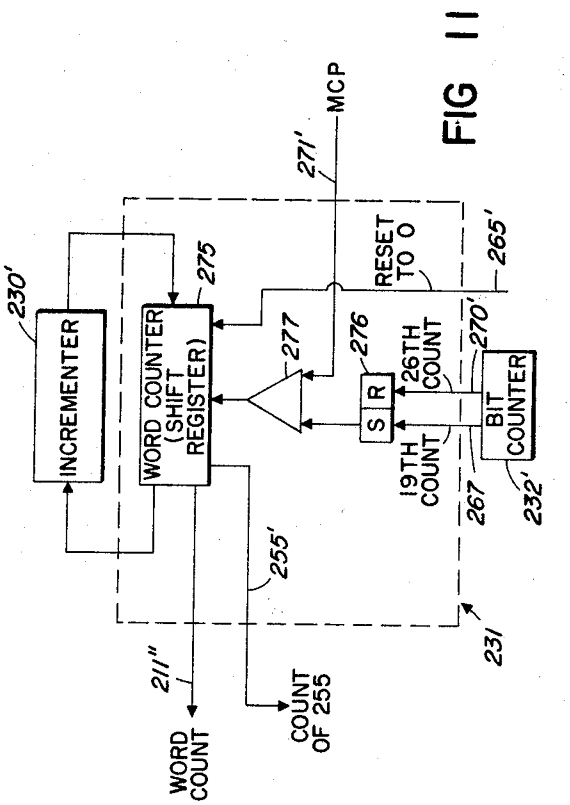
FIG. 11 is another logic diagram showing additional detail of the address keeping circuit.

As mentioned hereinbefore, the address of each word occurs during the 20–27th bit of the preceding word. Specifically, such address is not actually contained in the 34-bit word, but rather is contained in a counter called the word counter and identified by reference character 231 in FIG. 10. Such word counter is shown in detail in FIG. 11 and consists of an 8 stage shift register 275 with associated logic including AND gate 277 and a flip-flop 276. The flip-flop 276 has an input lead 267' leading to the set side thereof and an input lead 270' leading to the reset side thereof. Such two input leads come from the 19th and 26th bit count positions of the bit counter 232'. However, such counts actually follow the rise time of the master control pulse, and since the positive transitions of the master control pulse are supplied through AND gate 277 to advance the data contained in the shift register 275, the first positive rise time of the master control pulse will actually pass through the AND gate 277 on the count of 20 of the bit counter and the last positive rise time of the master control pulse will pass through AND gate 277 on count 27 of bit counter 232'.

The eight positive transitions of the master control pulse will cause shift register 275 to shift eight positions and thereby recirculate the count contained therein through incrementer 230' which will add a "1" thereto each time the counter is shifted thereto, thus keeping the word count up to date.

IV. WRITE-IN AND READ-OUT MEANS

Referring now to FIG. 12, there is shown another block diagram of the invention with emphasis on the detailed logic required for writing and reading data into and from the recirculating memory, and also means for addressing a particular memory from a group of memories.

Those blocks of FIG. 12 which correspond to blocks of FIGS. 10 or 4 are identified with similar reference characters, although primed. For example, the large dotted block 207'' of FIG. 12 corresponds to the block 207' of FIG. 10 and the block 207 of FIG. 4. Similarly, block 206'' of FIG. 12 corresponds to block 206' of FIG. 10 and 206 of FIG. 4. Other corresponding blocks are identified similarly with corresponding reference characters.

In order to read data out of a particular memory, such particular memory must first be addressed. To address a memory, an address code is supplied to the input terminals 350 of AND gate 333. A binary "1" output from AND gate 333 will occur when the proper address is supplied thereto to energize AND gates 330, 331, 332, 334, and 335. The word count, the bit 32 count, and the data will now flow freely through AND gates 330, 331, and 332, respectively, as they occur and will be received and processed by the data processor. More specifically, the data processor will then be able to determine each bit count from the bit 32 count, and will be able to determined which word is about to be transmitted from the word count. The data processor, in accordance with such addressing material, can then handle the data in an appropriate manner.

To write data into the memory requires the use of the logic within the block 210' of FIG. 12. First, consider the case where no data is being written into the recirculating memory, but where the stored data is simply recirculating. Such data passes from flip-flop 342 through AND gate 337, which is at that time conductive, and then passes through OR gate 339 to flip-flop 343, and then on through the loop. The reason AND gate 337 is conductive at this time is as follows. When no data is being written into the memory, a binary "0" is appearing on the Write-In input lead 351 so that the output of AND gate 334 is a binary "0." Such binary "0" is inverted by inverter 336 to provide a binary "1" on input lead 353 of AND gate 337; thus causing AND gate 337 to pass signals appearing on its other input lead 354.

When information is to be written into the memory, however, the processor will supply a "1" to the WRITE-IN input lead 351, which will cause a binary "1" at the output of AND gate 334. Such binary "1" will be inverted by inverter 336 to supply a binary "0" to input lead 353 of AND gate 337, thus closing AND gate 337 and making it nonconductive to the recirculating data.

The same binary "1" from AND gate 334 will be supplied to input lead 355 of AND gate 338 and will open AND gate 338 to data supplied thereto from its other input 356. Such data is supplied from an external source, (the data processor), via input lead 352 to AND gate 335, which has been opened by the proper address being supplied to the line address AND gate 333. Thus, the input data supplied to lead 352 will pass through AND gates 335 and 338, and then through OR gate 339 into the recirculating loop.

It is to be noted that three flip-flops 340, 341, and 342 are provided between the output of buffer select logic circuit 283' and the input to AND gate 337. The use of these three flip-flops functions to permit data to be read out of the memory at a given time and to permit data to be written back into the memory one bit interval later without losing the proper timing within the circulating memory. The one bit delay is caused by the flip-flop 342 which requires a one bit interval for data to pass therethrough.

Such a one bit interval delay permits the data processor to act on each bit of a word as they are read from the memory and then to supply either the same bit or a processed bit back into the memory one bit interval later. Functionally, the logic of blocks 210' and 206'' permits a word to be read from the memory and a new word to be written into the memory during a single pass of the word location. Alternatively, the logic permits a new word to be read into the memory and an existing word to be erased during a single pass. A third alternative is that a word can be read from the memory and nothing replaced into the word address. By "nothing" is meant a series of spaces.

V. OVERALL SYSTEM OPERATION

Figure 13:
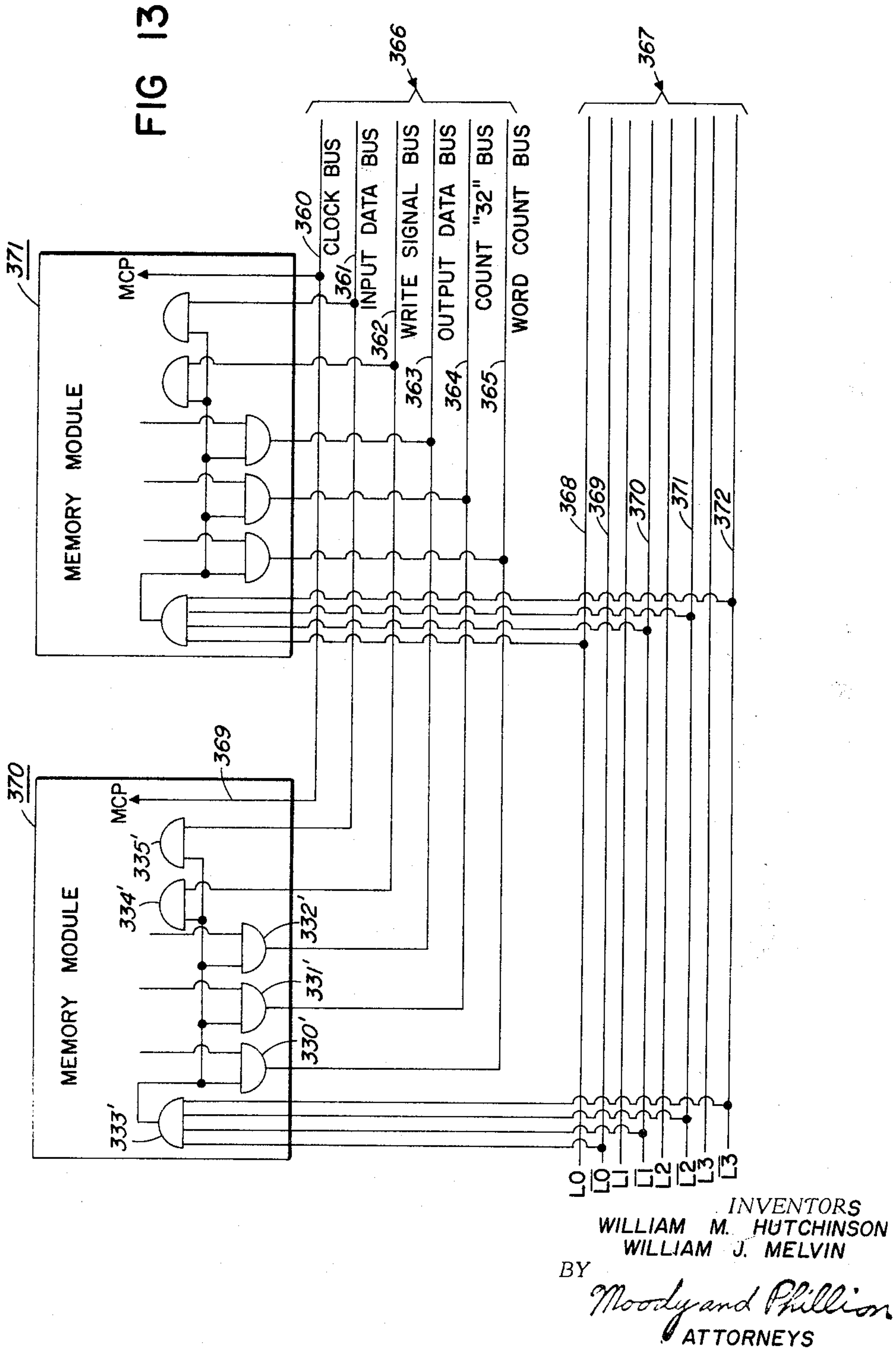
FIG. 13 is a logic diagram showing how a plurality of recirculating memories can be employed in a system.

Referring now to FIG. 13, there is shown a means for employing two or more recirculating memories in a system. More specifically, in FIG. 13 the blocks 370 and 371 each represent a memory of the type shown in FIG. 12. Each such memory has an addressing AND gate such as AND gate 333' of memory 370 of FIG. 13. Also present in the memory 370 is a word count output gate 330', a bit 32 count output gate 331', a data output gate 332', a WRITE-IN gate 334', a data input gate 335', and a master control pulse source lead 360. It should be noted that the master control pulse lead 360 of FIG. 13 corresponds to the master oscillator circuit 209' of FIG. 12, which is shown in block form in FIG. 12 for convenience.

The input leads and output leads to each of the memory modules can be divided into two main categories as can be seen from FIG. 13. The first of these categories is designated by reference character 336 and consists of the following: the master control pulse common bus 360, an input data bus 361, a WRITE-IN signal bus 362, an output data bus 363, a count 32 bus 364, and a word count bus 365. Each of these buses is common to all of the memory modules.

The second group of leads is identified by reference character 367 and carries the address codes to the various memory modules. The memory module 370, for example, is addressed by signals on leads 369, 370, 371, and 372, whereas the memory module 371 is addressed by signals on leads 368, 370, 371, and 372. Other modules would have different groups of address leads.

It is to be understood that the form of the invention shown and described herein is but a preferred embodiment thereof and that various changes may be made in organization and in detailed logic thereof, without departing from the spirit or scope thereof.

We claim:

1. A recirculating memory for recirculating a pulse train comprising a first group of time synchronous data pulses and a second group of time synchronous synchronizing pulses;

said recirculating memory comprising:

input means;

output means;

delay line means;

first timing means responsive to the synchronizing pulses supplied from said delay line means to become synchronized therewith with a predetermined phase relation;

shift register means comprising a plurality of stages including a first stage;

said first stage responsive to the output of said delay line means to produce a first two-level output signal representative of the data and synchronizing pulses passing through said delay line means;

the remaining stages of said shift register responsive to said first two-level output signal to produce a second two-level signal;

means for supplying the said second two-level output signal to the input of said delay line means;

second timing means;

selecting circuit means responsive to the phase of the output of said first timing means with respect to the phase of said second timing means to shift an intermediate stage of said shift register means with said second timing means near the optimum shifting time to provide a predetermined constant phase between said second two-level output signal and said second timing means.

2. A recirculating memory in accordance with claim 1 in which:

the group of data pulses of said pulse train is comprised of N words with each word having M bits;

the group of synchronizing pulses is comprised of S pulses;

said train of pulses includes a marking pulse following said group of synchronizing pulses;

and in which said recirculating memory comprises timekeeping counting means constructed to keep track of the address location of each of said N words and to keep track of the chronological number of each bit of each word supplied from the output means of said recirculating memory.

3. A recirculating memory in accordance with claim 2 comprising:

starting circuit means for recognizing and responding to said marking pulse to reset said timekeeping counting means to zero at the proper time at the beginning of each cycle of data recirculation;

said starting circuit means comprising timing ambiguity resolving means for resetting said timekeeping counting means to zero in accordance with the selected optimum shifting timing of said intermediate stage of said shift register means.

4. A recirculating memory in accordance with claim 3 in which said timekeeping counting means comprises:

first bit counting means comprising first output terminal means and constructed to count the bits in each word and to supply to said output terminal a particular predetermined bit count of each word to provide means for synchronization external to said recirculating memory;

and second word counting means comprising second output terminal means and constructed to count the words during each recycling of said pulse train, each word being represented by a different count which functions as the address therefore;

each word count occurring during a predetermined span of counts of each word;

and means for supplying said count-indicating addresses to the output terminal means of said second word counting means once each word.

5. A recirculating memory in accordance with claim 4 in which:

said first timing means is constructed to produce a reference square-wave output signal having alternate half cycles of a given polarity occur in the middle of successive bit periods;

said recirculating memory further comprising:

means for inverting said second timing signal;

first logic means responsive to coincidence of said alternate half cycles of said reference signal and a transition period of selected polarity of said uninverted second timing signal to select said uninverted second timing signal to shift said intermediate stage of said shift register means;

and second logic means responsive to coincidence of said alternate half cycles of said reference signal and the transition periods of selected polarity of said inverted second timing signal to select said inverted second timing signal to shift said intermediate stage of said shift register means.

6. A recirculating memory means in accordance with claim 5 in which:

said shift register means comprises at least three stages in series, with the middle stage comprising said intermediate stage;

said two-level output signal of said first stage of said delay line being supplied to the intermediate stage of said shift register means;

and the shifting of information out of said third stage of said shift register means being controlled by the uninverted second timing signal.

7. A recirculating memory means in accordance with claim 6 comprising:

third logic means for selectively effecting the reading-out or writing-in of data out of or into said recirculating memory, comprising:

external addressing means for addressing a particular recirculating memory;

first gating means responsive to externally supplied control and data signals to interrupt the recirculation of said pulse train and to supply new data in lieu of the interrupted portion of said pulse train;

said first gating means constructed to permit flow of said recirculating pulse train in the absence of said external control signals;

a fourth stage of said shift register means connected between said third stage and said first gating means;

and second gating means responsive to the said external control signal to supply the output signal of said third stage to an external load means.

8. A recirculating memory means in accordance with claim 7 in which said first timing means comprises:

variable controlled oscillator means;

phase detecting means which, when energized, is responsive to the group of synchronizing pulses of said pulse train and the output of said variable controlled oscillator means to adjust the frequency and phase of said variable controlled oscillator means to that of said synchronizing pulses;

and means responsive to said marking pulse to disconnect said phase detecting means from said group of synchronizing pulses and from said variable controlled oscillator.

9. A recirculating memory in accordance with claim 2 in which said timekeeping counting means comprises:

first bit counting means comprising first output terminal means and constructed to count the bits in each word and to supply to said output terminal a particular predetermined bit count of each word to provide means for synchronization external to said recirculating memory;

second word counting means comprising second output terminal means and constructed to count the words during each recycling of said pulse train, each word being represented by a different count which functions as the address therefore;

each word count occurring during a predetermined span of counts of each word;

and means for supplying said count-indicating address to the output terminal means of said second word counting means once each word.

10. A recirculating means in accordance with claim 9 in which:

said first timing means is constructed to produce a reference square-wave output signal having alternate half cycles of a given polarity occur in the middle of successive bit periods;

said recirculating means further comprising:

means for inverting said second timing signal;

first logic means responsive to coincidence of said alternate half cycles of said reference signal and a transition period of selected polarity of said uninverted second timing signal to select said uninverted second timing signal to shift said intermediate stage of said shift register means;

and second logic means responsive to coincidence of said alternate half cycles of said reference signal and the transition periods of selected polarity of said inverted second timing signal to select said inverted second timing means to shift said intermediate stage of said shift register means.

11. A recirculating memory means in accordance with claim 10 in which:

said shift register means comprises at least three stages in series with the middle stages comprising said intermediate stage:

said two-level output signal of said first stage of said delay line being supplied to the intermediate stage of said shift register means;

and the shifting of information out of said third stage of said shift register means being controlled by the uninverted second timing means, 12. A recirculating memory means in accordance with claim 11 comprising:

third logic means for selectively effecting the reading-out or writing-in of data out of or into said recirculating memory, comprising:

external addressing means for addressing a particular recirculating memory;

first gating means responsive to externally supplied control and data signals to interrupt the recirculation of said pulse train and to supply new data in lieu of the interrupted portion of said pulse train;

said first gating means constructed to permit flow of said recirculating pulse train in the absence of said external control signals;

a fourth stage of said shift register means connected between said third stage and said first gating means;

and second gating means responsive to the said external control signal to supply the output signal of said third stage to an external load means.

13. A recirculating memory means in accordance with claim 12 in which said first timing means comprises:

variable controlled oscillator means;

phase detecting means which, when energized, is responsive to the group of synchronizing pulses of said pulse train and the output of said variable controlled oscillator means to adjust the frequency and phase of said variable controlled oscillator means to that of said synchronizing pulses;

and means responsive to said marking pulse to disconnect said phase detecting means from said group of synchronizing pulses and from said variable controlled oscillator.

14. A recirculating memory in accordance with claim 2 in which:

said first timing means is constructed to produce a reference square-wave output signal having alternate half cycles of a given polarity occur in the middle of successive bit periods;

said recirculating means further comprising:

means for inverting said second timing signal;

first logic means responsive to coincidence of said alternate half cycles of said reference signal and a transition period of selected polarity of said uninverted second timing signal to select said uninverted second timing signal to shift said intermediate stage of said shift register means;

and second logic means responsive to coincidence of said alternate half cycles of said reference signal and the transition periods of said selected polarity of said inverted second timing signal to select said inverted second timing means to shift said intermediate stage of said shift register means.

15. A recirculating memory for recirculating a pulse train comprising a first group of data pulses, a second group of synchronizing pulses, and a marker pulse marking the end of said group of synchronizing pulses;

said recirculating means comprising:

input means;

output means;

delay line means;

pulse reshaping means comprising:

variable controlled receive oscillator timing means comprising input and output means and constructed to detect and reshape the output signal from said dela yline means into a received two-level waveform;

means for connecting the input means to said receive oscillator timing means to said synchronizing pulses to synchronize said receive oscillator timing means;

means responsive to said marker pulse to terminate synchronization of said receive oscillator timing means;

master clock timing means;

phase shifting means comprising shift register means and responsive to said received two-level waveform and said master clock timing means to shift the phase of said two-level signal at the optimum transition time of said master clock timing signal to cause the phase shifted two-level signal to bear a known and predetermined phase with said master clock pulse;

and input means for supplying the phase shifted two-level output signal from said phase shifting means into said delay line means.

16. A recirculating memory in accordance with claim 15 in which:

the group of data pulses of said pulse train is comprised of N words with each word having M bits;

the group of synchronizing pulses is comprised of S pulses and in which said recirculating memory comprises timekeeping counting means constructed to keep track of the address location of each of said N words and to keep track of the chronological number of each bit of each word supplied from the output means of said recirculating memory.

17. A recirculating memory in accordance with claim 16 comprising:

starting circuit means for recognizing and responding to said marking pulse to reset said timekeeping counting means to zero at the proper time at the beginning of each cycle of data recirculation;

said starting circuit means comprising timing ambiguity resolving means for resetting said timekeeping counting means to zero in accordance with the selected optimum time of phase shift of said two-level signal.

18. A recirculating memory in accordance with claim 17 in which said time-keeping counting means comprises:

first bit counting means comprising first output terminal means and constructed to count the bits in each word to supply to said output terminal a particular predetermined bit count of each word to provide means for synchronization external to said recirculating memory;

and second word counting means comprising second output terminal means and constructed to count the words during each recycling of said pulse train, each word being represented by a different count which functions as the address therefore;

each word count occurring during a predetermined span of counts of each word;

and means for supplying said count-indicating addresses to the output terminal means of said second word counting means once each word.

19. A recirculating memory in accordance with claim 18 in which:

said first timing means is constructed to produce a reference square-wave output signal having alternate half cycles of a given polarity occur in the middle of successive bit periods;

said recirculating memory further comprising:

means for inverting said second timing signal;

first logic means responsive to coincidence of said alternate half cycles of said reference signal and a transition period of selected polarity of said uninverted second timing signal to select said uninverted second timing signal to shift an intermediate stage of said shift register means;

and second logic means responsive to coincidence of said alternate half cycles of said reference signal and the transition periods of said selected polarity of said inverted second timing signal to select said inverted second timing signal to shift said intermediate stage of said shift register means.

20. A recirculating memory means in accordance with claim 19 in which:

said shift register means comprises at least two stages in series, with the first stage comprising said intermediate stage;

said two-level output signal from the output of said delay line being supplied to the intermediate stage of said shift register means;

and the shifting of information out of said third stage of said shift register means being controlled by the uninverted second timing signal.

21. A recirculating memory means in accordance with claim 20 comprising:

third logic means for selectively effecting the reading-out or writing-in of data out of or into said recirculating memory, comprising:

external addressing means for addressing a particular recirculating memory;

first gating means responsive to externally supplied control and data signals to interrupt the recirculation of said pulse train and to supply new data in lieu of the interrupted portion of said pulse train;

said first gating means constructed to permit flow of said recirculating pulse train in the absence of said external control signals;

a third stage of said shift register means connected between said second stage and said first gating means;

and second gating means responsive to the said external control signal to supply the outer signal of said second stage to an external load means.

22. A recirculating memory means in accordance with claim 21 in which said variable controlled receive oscillator timing means comprises:

variable controlled oscillator means;

phase detecting means which, when energized, is responsive to the group of synchronizing pulses of said pulse train and the output of said variable controlled oscillator means to adjust the frequency and phase of said variable controlled oscillator to that of said synchronizing pulses;

and means responsive to said marking pulse to disconnect said phase detecting means from said group of synchronizing pulses and from said variable controlled oscillator.

23. A recirculatory memory in accordance with claim 16 in which said timekeeping counting means comprises:

first bit counting means comprising first output terminal means and constructed to count the bits in each word and to supply to said output terminal means a particular predetermined bit count of each word to provide means for synchronization external to said recirculating memory;

and second word counting means comprising second output terminal means and constructed to count the words during each recycling of said pulse train, each word being represented by a different count which functions as the address therefore;

each word count occurring during a predetermined span of counts of each word;

and means for supplying said count-indicating address to the output terminal means of said second word counting means once each word.

24. A recirculating memory in accordance with claim 23 in which:

said first timing means is constructed to produce a reference square-wave output signal having alternate half cycles of a given polarity occur in the middle of successive bit periods;

said recirculating memory further comprising:

means for inverting said second timing signal;

first logic means responsive to coincidence of said alternate half cycles of said reference signal and a transition period of selected polarity of said uninverted second timing signal to select said uninverted second timing signal to shift an intermediate stage of said shift register means;

and second logic means responsive to coincidence of said alternate half cycles of said reference signal and the transition periods of said selected polarity of said inverted second timing signal to select said inverted second timing signal to shift said intermediate stage of said shift register means.

25. A recirculating memory means in accordance with claim 24 in which:

said shift register means comprises at least two stages in series, with the first stage comprising said intermediate stage;

said two-level output signal of said first stage of said delay line being supplied to the intermediate stage of said shift register means;

and the shifting of information out of said third stage of said shift register means being controlled by the uninverted second timing signal.

26. A recirculating memory means in accordance with claim 25 comprising:

third logic means for selectively effecting the reading-out or writing-in of data out of or into said recirculating memory, comprising:

external addressing means for addressing a particular recirculating memory;

first gating means responsive to externally supplied control and data signals to interrupt the recirculation of said pulse train and to supply new data in lieu of the interrupted portion of said pulse train;

said first gating means constructed to permit flow of said recirculating pulse train in the absence of said external control signals;

a third stage of said shift register means connected between said second stage and said first gating means;

and second gating means responsive to the said external control signal to supply the output signal of said second stage to an external load means.

27. A recirculating memory means in accordance with claim 26 in which said variable controlled receive oscillator timing means comprises:

variable controlled oscillator means;

phase detecting means which, when energized, is responsive to the group of synchronizing pulses of said pulse train and the output of said variable controlled oscillator means to adjust the frequency and phase of said variable controlled oscillator to that of said synchronizing pulses;

and means responsive to said marking pulse to disconnect said phase detecting means from said group of synchronizing pulses and from said variable controlled oscillator.

28. A recirculating memory in accordance with claim 16 in which:

said first timing means is constructed to produce a reference square-wave output signal having alternate half cycles of a given polarity occur in the middle of successive bit periods;

said recirculating memory further comprising:

means for inverting said second timing signal;

first logic means responsive to coincidence of said alternate half cycles of said reference signal and a transition period of selected polarity of said uninverted second timing signal to select said uninverted second timing signal to shift an intermediate stage of said shift register means;

and second logic means responsive to coincidence of said alternate half cycles of said reference signal and the transition periods of said selected polarity of said inverted second timing signal to select said inverted second timing signal to shift said intermediate stage of said shift register means.

References Cited

UNITED STATES PATENTS

| | | | |
|---|---|---|---|
| 2,783,455 | 2/1957 | Hindall | 340—173 |
| 2,961,535 | 11/1960 | Lanning | 340—173 X |
| 3,064,241 | 11/1962 | Schneider | 340—173 |

OTHER REFERENCES

E. F. Bradley and L. H. Lee: "Delay Line-Variable Clock Synchronization," IBM-TDB, v. 6, n. 9, February 1964, pp. 73–74.

BERNARD KONICK, *Primary Examiner.*

J. F. BREIMAYER, *Assistant Examiner.*

U.S. Cl. X.R.

235—165; 340—172.5

UNITED STATES PATENT OFFICE

CERTIFICATE OF CORRECTION

Patent No. 3,432,816

March 11, 1969

William M. Hutchinson et al.

It is certified that error appears in the above identified patent and that said Letters Patent are hereby corrected as shown below:

Column 1, line 56, "contact" should read -- constant --. Column 7, line 52, "sample" should read -- sampling --. Column 9, line 57, after "OR" insert -- gate --; line 62, "phase" should read -- phases --. Column 20, line 46, "outer" should read -- output --.

Signed and sealed this 31st day of March 1970.

(SEAL)
Attest:

Edward M. Fletcher, Jr.
Attesting Officer

WILLIAM E. SCHUYLER, JR.
Commissioner of Patents